Patented Nov. 12, 1929

1,735,835

UNITED STATES PATENT OFFICE

WILLIAM BURNET McCALLUM, OF SALINAS, CALIFORNIA

METHOD OF TREATING AND SOWING GUAYULE SEED

No Drawing.   Application filed March 22, 1927.   Serial No. 177,476.

This invention relates to the treatment of guayule seed, and more particularly to a method of preparing the seed for regular nursery operations after it has begun to germinate or is about to begin germinating.

An object of the present invention is to increase the percentage of germination of guayule seeds from the time that the seeds are ready for planting.

One of the difficulties to be overcome in connection with this seed is the fact that, though capable of germination in itself, it does so slowly and irregularly and both the slowness and irregularity are further accentuated by low temperatures at the usual time of sowing. During germination the seed is very sensitive to any exclusion of air and for this reason covering it, even with a very thin layer of soil, materially retards the germination. On the other hand, the surface of the bed must be kept moist, for if the sprouting seed becomes dry, it is killed. The little seedlings have very weak capacity to break through a crusted soil and many of them are lost if the soil becomes crusted as it is very apt to do when watered and dried alternately. Furthermore, when the surface is kept moist, danger due to damping-off disease and other unsanitary soil conditions is frequently encountered. It is, therefore, of the greatest importance to reduce, as much as possible the period between the sowing of the seed and its germination.

Sown in the open it ordinarily takes about two weeks for the seed to come up. An object of the present invention is to reduce this critical period and obtain a higher yield of plants from the seeds sown. In carrying out the invention the seeds that have passed through either an artificial or natural "after ripening" period are dampened and spread from three to four inches deep in drawers or boxes. The seeds are kept damp but with good ventilation and stirred at least once a day to keep them well aired. In this condition, the seed starts to sprout in from three to six days. Just when the seed is starting to sprout is the best time to sow it. The seeds are sown in nursery beds on the surface of the soil and are pressed into firm contact with the ground. They are then covered with a layer of sand, approximately one-eighth inch in thickness.

In a typical example of the invention, the unthreshed seed, still enclosed in the chaff is first thoroughly washed in a tank of running water from twelve to twenty-four hours. This removes toxic material from the surface of the seed and from the chaff which would interfere with subsequent germination and sprouting. The toxic material also if not removed causes loss of seed by rotting during the period of presprouting. After washing, the seeds are partially dried preferably by placing them in a press and squeezing out excess water. The seeds taken from the press are damp and these damp seeds are spread out in boxes or drawers and permitted to remain in this condition for a period of three to six days. The seeds may be placed in the boxes or drawers to a depth of from three to four inches provided they are stirred at regular intervals to permit them to be well aired. I have found that the damp seeds, if well ventilated, will sprout properly if stirred once a day. The temperature maintained will affect the length of the presprouting period. At a temperature of 80° F. the seed usually sprouts in four days, but at a lower temperature, a longer period is necessary. Just when the seed is starting to sprout is the most favorable time to sow it. In this condition, however, it is usually very sticky due to the presence of a certain amount of mucilaginous material that develops during the presprouting period and which makes the seed very difficult to spread uniformly in the sowing operation. This sticky condition can be relieved by thoroughly mixing the sprouting seed, just previous to sowing, with a suitable amount of finely sifted leaf-mould or similar absorbent material. The quantity of absorbent material will vary according to the stickiness of the seed but as a general rule will amount to approximately one-third the volume of the seed.

After mixing the seed with the absorbent material to relieve the stickiness and permit them to be distributed uniformly during the sowing operation, the seeds are sown in the nursery beds by distributing them on the surface of the soil. The seeds so distributed should be brought into firm contact with the ground and I accomplish this purpose by rolling the seed and pressing it into contact with the ground, but still keeping it on the surface. The entire bed is then covered with a layer of sand of approximately one-eighth inch thickness. The covering of sand permits the free access of air which is vital to the seed and also permits watering the bed without forming a crust over the seed. It also removes the risk of the seeds blowing or of becoming exposed and failing to take root. By means of my process the critical period between planting and taking root is reduced from a period of about two weeks to a period of three days and it is during this period that the greatest percentage of losses have heretofore occurred. This not only results in an increased yield but also produces a material labor saving between the time that the seeds are sown and the time when the roots are established in the soil which has heretofore required the most exacting care under the old and usual practice of sowing.

I claim:

1. The herein described process consisting essentially of pre-sprouting guayule seeds, sowing the pre-sprouted seeds on the surface of a bed and covering the sowed seeds with a non-crusting layer of the earthy material of approximately one-eighth inch thickness.

2. The herein described process consisting essentially of pre-sprouting guayule seeds, sowing the pre-sprouted seeds on the surface of a bed and covering the sowed seeds with a layer of sand of approximately one-eighth inch thickness.

3. The herein described process consisting essentially of washing guayule seeds to remove toxic material, pre-sprouting the seeds, sowing them on the surface of a bed and covering them with a layer of non-crusting earthy material of approximately one-eighth inch thickness.

4. The herein described process consisting essentially of washing guayule seeds to remove toxic material, pre-sprouting the seeds, sowing them on the surface of a bed and covering them with a layer of sand of approximately one-eighth inch thickness.

5. The process consisting essentially of washing guayule seeds to remove toxic material, sowing them on the surface of a bed, rolling them to press them into firm contact with the ground, and covering them with a layer of non-crusting earthy material.

6. The process consisting essentially of washing guayule seeds to remove toxic material, sowing them on the surface of a bed, rolling them to press them into firm contact with the ground, and covering them with a layer of sand.

7. The process consisting essentially of pre-sprouting guayule seeds, mixing the seeds with absorbent material, sowing them on the surface of a bed, rolling them to press them into firm contact with the ground, and covering them with a layer of non-crusting earthy material.

In testimony whereof I affix my signature.

WILLIAM BURNET McCALLUM.